(12) United States Patent
Bolignano et al.

(10) Patent No.: US 7,882,396 B2
(45) Date of Patent: Feb. 1, 2011

(54) METHOD FOR CONTROLLING PROGRAM EXECUTION INTEGRITY BY VERIFYING EXECUTION TRACE PRINTS

(75) Inventors: Dominique Bolignano, Feucherolles (FR); Xavier Leroy, Versailles (FR); Renaud Marlet, Bordeaux (FR)

(73) Assignee: Trusted Logic, Versailles (FR)

( * ) Notice: Subject to any disclaimer, the term of this patent is extended or adjusted under 35 U.S.C. 154(b) by 917 days.

(21) Appl. No.: 10/585,140

(22) PCT Filed: Dec. 16, 2004

(86) PCT No.: PCT/FR2004/003273

§ 371 (c)(1),
(2), (4) Date: May 27, 2007

(87) PCT Pub. No.: WO2005/073859

PCT Pub. Date: Aug. 11, 2005

(65) Prior Publication Data

US 2010/0070804 A1    Mar. 18, 2010

(30) Foreign Application Priority Data

Dec. 31, 2003    (FR) .................................. 03 15633

(51) Int. Cl.
*G06F 11/00* (2006.01)
(52) U.S. Cl. .......................... 714/37; 717/129
(58) Field of Classification Search ............ 714/37; 717/129
See application file for complete search history.

(56) References Cited

U.S. PATENT DOCUMENTS

| | | | | |
|---|---|---|---|---|
| 3,551,659 A * | 12/1970 | Forsythe | ...................... | 714/38 |
| 4,533,997 A * | 8/1985 | Furgerson | ...................... | 703/21 |
| 5,124,989 A * | 6/1992 | Padawer et al. | ................ | 714/38 |
| 5,421,006 A * | 5/1995 | Jablon et al. | ................... | 714/36 |
| 6,463,535 B1 * | 10/2002 | Drews | ......................... | 713/176 |
| 6,978,444 B1 * | 12/2005 | Farchi et al. | ................. | 717/129 |
| 7,036,111 B2 * | 4/2006 | Dollin et al. | ................. | 717/126 |
| 7,257,805 B2 * | 8/2007 | Gritter | ......................... | 717/129 |
| 7,287,243 B2 * | 10/2007 | Dollin et al. | ................. | 717/126 |
| 7,296,259 B2 * | 11/2007 | Betker et al. | ................. | 717/129 |
| 7,299,458 B2 * | 11/2007 | Hammes | ...................... | 717/133 |
| 7,331,002 B2 * | 2/2008 | Rivard et al. | ................... | 714/35 |
| 7,383,539 B2 * | 6/2008 | Bates et al. | ................. | 717/129 |
| 7,461,368 B2 * | 12/2008 | White | ......................... | 717/129 |
| 7,472,378 B2 * | 12/2008 | Bennett et al. | .............. | 717/129 |
| 7,543,186 B2 * | 6/2009 | Schultz | ......................... | 714/35 |

(Continued)

FOREIGN PATENT DOCUMENTS

EP    0 606 802 A1    12/1993

(Continued)

*Primary Examiner*—Scott T Baderman
*Assistant Examiner*—Kamini Patel
(74) *Attorney, Agent, or Firm*—Browdy and Neimark, PLLC

(57) ABSTRACT

The inventive method for controlling a program execution integrity by verifying execution trace prints consists in updating the representative print of an execution path and/or data applied for a program execution, comparing the actual print value (dynamically calculated to an expected value (statistically fixed, equal to a value of the print if the program execution is not disturbed) at a determined program spots and in carrying out a particular processing by the program when the actual print differs from the expected value.

25 Claims, 1 Drawing Sheet

U.S. PATENT DOCUMENTS

| | | | |
|---|---|---|---|
| 7,555,419 B2 * | 6/2009 | Faraboschi et al. | 703/22 |
| 7,634,759 B2 * | 12/2009 | Calsyn et al. | 717/124 |
| 7,644,394 B2 * | 1/2010 | Arnold et al. | 717/128 |
| 7,689,868 B2 * | 3/2010 | Watson | 714/34 |
| 7,694,282 B2 * | 4/2010 | Arkhipov et al. | 717/129 |
| 2002/0199173 A1 * | 12/2002 | Bowen | 717/129 |
| 2003/0061487 A1 * | 3/2003 | Angelo et al. | 713/176 |
| 2006/0101310 A1 * | 5/2006 | Diamant et al. | 714/38 |
| 2008/0040587 A1 * | 2/2008 | Burke et al. | 712/227 |
| 2008/0267406 A1 * | 10/2008 | Asokan et al. | 380/277 |

FOREIGN PATENT DOCUMENTS

| | | |
|---|---|---|
| FR | 2 841 015 A1 | 6/2002 |
| WO | WO 00/54155 | 9/2000 |

* cited by examiner

METHOD FOR CONTROLLING PROGRAM EXECUTION INTEGRITY BY VERIFYING EXECUTION TRACE PRINTS

BACKGROUND OF THE INVENTION

1. Field of the invention

The subject of the present invention is a method for controlling the program execution integrity by verifying execution trace prints.

2. Description of the Prior Art

It applies in particular to controlling the integrity of program execution, said program execution updating a trace print representing the execution pathway and/or handled data, bearing in mind that at determined points of the program the current trace print value is compared with an expected value.

Some small, embedded systems, such as smart cards for example, are designed to protect the data and programs they contain. In particular the material substrate of these systems makes it very difficult to observe and modify stored data, including at the time of program execution.

Protection is not total however. These systems may be exposed to malicious action (also called «attacks») intended to deteriorate the proper functioning of the system and programs, or to unmask confidential information. Physical attacks (also called material attacks) are electric supply disturbances for example, radiation bombardment, the destruction of logic gates, etc.

Said attacks may lead to ill-functioning of the program executed on the card: the instructions and data read from the memory may be incorrect, and the processor may inaccurately execute some instructions. Said disturbances may render invalid a code which checks the security conditions before performing certain sensitive actions.

Let us suppose the following (simplified) example of a code written in language C:

```
if(!condition1( ))goto error;
if(!condition2( ))goto error;
do_sensitive_action( );
```

The sensitive action «do-sensitive-action( )» is normally only executed if the two conditions «condition1( )» and «condition2( )» are met. Nonetheless, physical disturbances may cause the processor to jump directly over the code of the two «ifs» or to read from the memory a series of different instructions of the code of the two «ifs». In this case, the processor may execute «do-sensitive-action( )» even if the tests «condition1( )» and «condition2( )» have not been met.

One technique known to «harden» a program against this type of attack consists of introducing redundancy between the program check flow and the values of certain auxiliary variables. In other words, auxiliary variables are used to keep a trace of the fact that execution has indeed passed through all checks of security conditions. In the case of the above example, it could be written as follows:

```
trace=0;
if(condition1( )trace| =1;else goto error;
if(condition2( )trace| =2;else goto error;
if(trace== 3) do_sensitive_action( );
```

Hence, if the first two «ifs» are not correctly executed, there is a strong chance that the «trace» variable does not equal 3 at the end, and therefore that the action «do-sensitive_action( )» is not executed.

Even in this case, a disturbance could cause the test «trace=3» to be true at all times or to be ignored also. As a general rule, for the relevance of the invention disclosed herein, it is assumed that disturbances caused by physical attacks are relatively unrefined; they can inactivate the execution of part of the program or change the apparent content of part of the memory, but the extent of this part is not finely controlled by the attacker.

This approach can be generalized as follows. The program updates a value representing important control points through which its execution passes. This value can be a trace print e.g. a checksum calculated on integers which characterize these important control points. Before executing a sensitive operation, this value updated during execution may be compared with its normal (expected) value, manually pre-calculated by the programmer from the control structure of the program. For example:

```
trace = 42:
for(i = 0;i<4;i++) {
    if(provided_pin[i]!=actual_pin[i]goto error;
    trace = h(trace,i);
}
if(trace== 2346)do_sensitive_action( );
```

It is to be noted however that a PIN code is not usually checked in this way; this is merely an example to illustrate the use of trace print calculation.

The tracing print operator used here is the linear congruency «$h(t,x)=((33*t) \mod(2^{16})) \text{ xor } x$» in which:
«$a*b$» represents the product of «a» by «b»,
«a mod b» represents the remainder of the division of «a» by «b» (i.e. the modulo);
«$a^b$» represents the raising of «a» to power «b»,
«a xor b» is the operation «or exclusive logic» on the bits representing «a» and «b».

The value 2346 is no other than «$h(h(h(h(42,0), 1), 2), 3)$» i.e. the trace print of normal execution of the loop (4 turns per «i» variant of 0 to 3). If the loop is not executed or if it finishes abnormally before making 4 turns, the value of the «trace» variable before the «do_sensitive_action( )» call will most probably be different from 2346.

This tracing print operator "h" can be seen as an operator which allows incremental calculation of a tracing print function "H" which operates on sequences of integers which characterize said important control points. This tracing print function on the observation sequences is defined by: «$H(T_0, i_1, i_2, \ldots, i_n)=h(\ldots h(h(T_0, i_1), i_2) \ldots, i_n)$».

So that it can be used in small embedded systems having low calculating capacity, the «h» tracing print operator must be quick to calculate. Also, the resulting «H» tracing print function must be preimage resistant: the probability that the trace print «$H(T_0, i_1, \ldots, i_n)$» of a random sequence «$T_0, i_1, \ldots, i_n$» equals a given value must be low (in the order of $2^{-B}$ where B is the number of bits to encode the trace print value).

In some cases described below, it may also be helpful to have a tracing print operator «h» which is invertible in its first argument: for all values «t'» and «x», «t» exists such that «$t'=h(t, x)$».

It is possible for example to use a linear congruency for «h», as is the case in the example given above. This linear congruency also has the property of being invertible. More generally, any function can be used which combines the following operations: addition, subtraction or exclusive logic (xor) with a constant or with «x», rotation of a constant number of bits; multiplication by an uneven constant.

It is also possible to use a cyclic redundancy check function (CRC) such as CRC-16; said function can be calculated efficiently using pre-calculated tables.

On the other hand, even if a checksum (defined as the sum of integers which have matched arguments) does have good properties of rapid calculation, preimage resistance and invertibility, it is little satisfactory since the tracing print function obtained is insensitive to the order of arguments.

At the other end of the spectrum there are cryptographic tracing print functions (digests such as SHA-1, MD-5, etc) which are very secure but also very costly to calculate.

Trace print setting can be made by means of two main operations of trace print assignment and trace print updating: «setTrace(T)» fixes the initial value of the trace print at «T» (typically any value), and "addTrace(N)" adds an integer "N" to the trace that is characteristic of an observation of program execution. In the above example, «setTrace(T)» corresponds to the assignment «trace=T»; and «addTrace(N)» corresponds to update of the trace print by «trace=h(trace,N)».

The value "N" supplied during an operation «addTrace(N)» can itself be the result of a tracing print function. The more the integer «N» is representative of local execution of the program, i.e. the more «N» varies in the presence of a possible execution disturbance, the better the detecting power of an attack.

Trace print controlling can be made using a single operation: «checkTrace(T)» checks that the current value of the trace print is indeed «T». If not, it is an indication that the program has undergone attack. Strictly speaking, systems such as smart cards wear out and a trace print difference could also be the sign of a material fault.

At all events, the program can no longer provide the service for which it was designed. In critical systems, the measures taken under such circumstances typically consist of securitizing some program data and interrupting program execution whether definitively or not. When materially possible, a sound or visual signal could alert the user of the ill-functioning.

In the light of the above example, it is obvious that the implementing of this technique requires much effort on the part of the programmer, firstly to insert the calculation steps of the trace print, and secondly to calculate the expected trace print values at the points where it is to be checked.

OBJECT OF THE INVENTION

Having regard to the problems put forward above, the purpose of the invention is more particularly the generalization of this technique and its automation.

SUMMARY OF THE INVENTION

For this purpose, it proposes a method for controlling the integrity of program execution by verifying trace prints of execution traces by:
updating a trace print representing the execution pathway and/or handled data during program execution,
comparing said trace print (current value, calculated dynamically) with an expected value (statically fixed, equal to the value which the trace print should have if program execution is not disturbed) at determined points of the program,
performing special treatment if the current trace print differs from the expected value.

This method may take into account:
that said trace print only relates to critical code fragments of the program;
that the expected values of the trace print at given points of the program are determined by static program analysis which may optionally modify the program code so that trace print values are predictable.

BRIEF DESCRIPTION OF THE DRAWINGS

This method and its improvement are described in more detail below as non-limitative examples, and with reference to the following drawing, in which.

DESCRIPTION OF THE PREFERRED EMBODIMENTS

Figure 1:
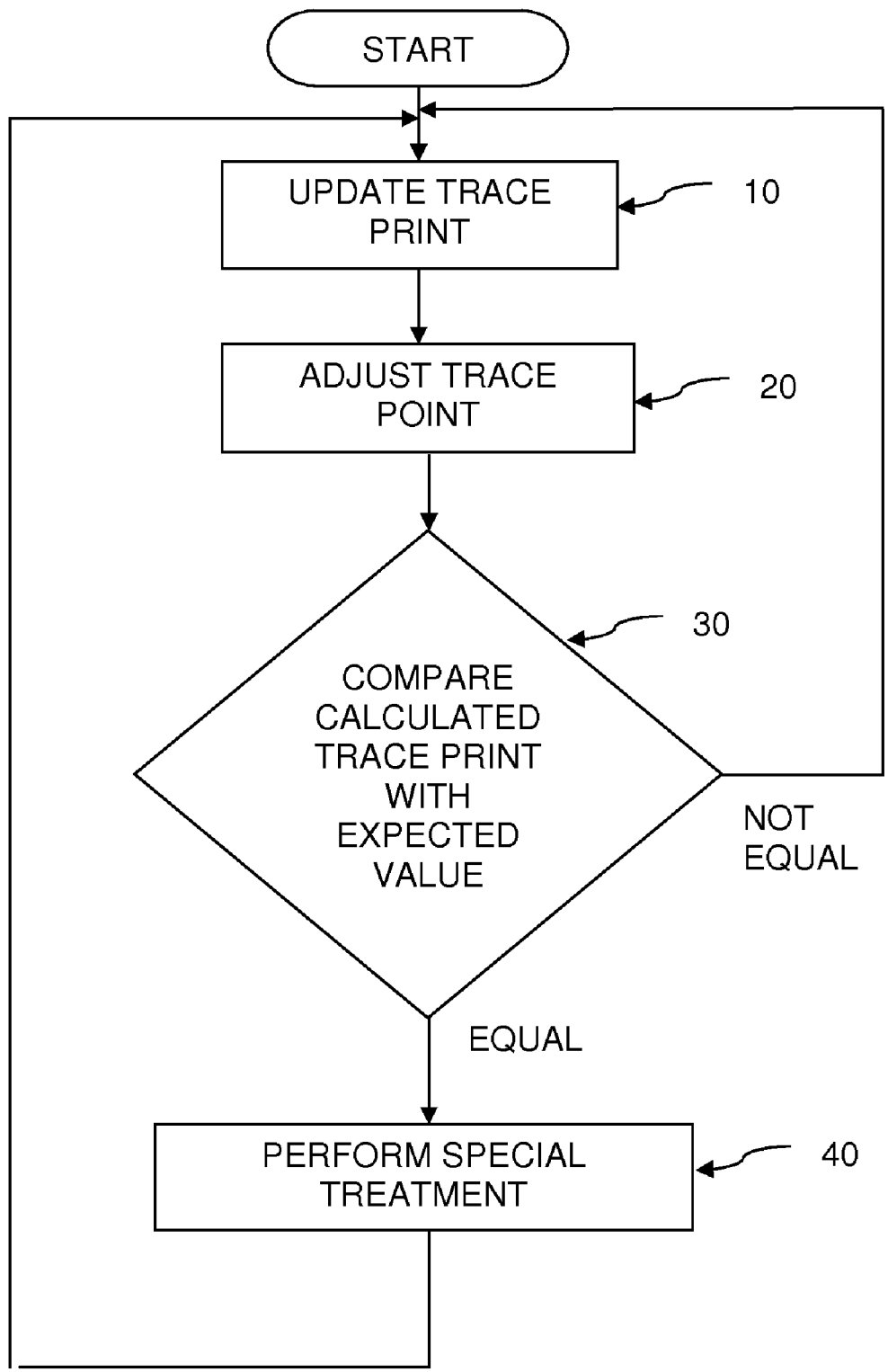
FIG. 1 is a flowchart illustrating the method according to the present invention.

FIG. 1 is a flowchart illustrating the method for controlling program execution integrity by verifying execution traces according to one embodiment of the invention. At step 10, a trace print representing an execution pathway and/or handled data on program execution is updated. At step 20, the trace point along the execution pathways is adjusted before reaching certain points of convergence of a check flow so that trace prints of converging pathways are made equal. At step 30, the trace print calculated dynamically is compared with an expected value fixed statically, equal to a value the trace print should have if program execution is not disturbed at determined points of the program. At step 40, special treatment is performed if the current trace print differs from the expected value.

Program analysis to determine expected trace print values can be divided into several steps. Firstly consideration is given to a program routine (method, sub-program, etc.) of the program.

If all the instructions separating the start of the program routine from a trace print control point are linear, i.e. do not contain any branches, the expected value of the trace print is simply «$h(\ldots h(h(T_0, i_1), i_2) \ldots, i_n)$» where «$T_0$» is the initial value of the trace print and where «$i_1, \ldots, i_2$» are integers representing execution at the various observation points on the execution pathway.

More generally, since a program routine is broken down into basic blocks, if the value of the trace print is known statically at the start of one basic block, its value will be similarly known at every point of the block.

When several different execution pathways lead to one same program point, it is not possible to predict «the» expected trace print value at this program point since there are several thereof. In this case the trace print values are «equalized» at the join points in the check flow: on each branch which leads to the join point (possibly with the exception of one of the branches) a constant value is added to the current trace print so that the resulting trace print is the same for each branch, once the join point has been reached. This addition can be made explicitly in the code, e.g. by direct operation on the trace print value or call to a dedicated program routine. Let the program be the following for example:

```
if(cond) {
    addTrace(1);
    ...
    addTrace(2);
} else {
    addTrace(3);
    ...
    addTrace(4);
}
```

If the trace print has a value «$T_0$» before «if» it will respectively have the values «$h(h(T_0, 1), 2)$» and «$h(h(T_0, 3), 4)$» at the end of each of the two branches of this «if». To establish a trace print control point after this «if», it is possible to equalize the branches as follows:

```
if(cond) {
    addTrace(1);
    ...
    addTrace(2);
} else {
    addTrace(3);
    ...
    addTrace(4);
    adjustTrace(X);
}
checkTrace(Y);
``` with the following definitions:
«adjustTrace(N)» adds the integer «N» to the current value of the trace print,
«X» is equal to «$h(h(T_0, 1), 2) - h(h(T_0, 3), 4)$»,
«Y» is equal to «$h(h(T_0, 1), 2)$».

Therefore, irrespective of the execution pathway taken, the trace print will always equal «Y» after «if». The fact of adding value «X» to the current value of the trace print makes this trace print predictable whilst preserving the fact that it is difficult to falsify. Adjustment could have been made symmetric fashion on the first branch of «if» rather than on the second.

This schematic applies also to the case of loops whose number of iterations is undetermined; on each iteration the trace print is adjusted to return to the same initial value.

The trace print adjustment operation «adjustTrace» is added to the trace print updating operation («addTrace») and trace print assignment operation («setTrace») to form the set of «trace print set» operations.

The trace print adjustment operation «adjustTrace(N)» does not necessarily need to be an operation based on an addition operation of the type «trace=trace+N;». It can be more generally defined as «trace=adjust(trace,N); » where «adjust(T,N)» is an invertible function in its first argument: for any trace print of origin «T» and any target trace print «T'», all that it is needed to know is how to determine «N=delta(T, T')» so that «adjust(T, N)=T'».

In this manner the addition: «adjust(T, N)=T+N» and «delta(T, T')=T'-T» is found. But it is also possible for example to use «or exclusive logic»: «adjust(T,N)=T xor N» and «delta(T, T')=T xor T'». The trace print adjustment «adjustTrace(delta(T, T'));» sends trace print «T» onto trace print «T'» whilst preserving difficult falsification.

Exception handlers of a program make it difficult to statically determine trace print values. Execution can connect itself onto the start of the handler code from any instruction covered by this handler. The trace print value at the start of the handler code is therefore not statically predictable. The insertion of trace print adjustments as described above for all instructions covered by an exception handler makes it possible in theory to ensure a known trace print value at the start of the handler. However, since the number of necessary adjustments is high, this may be costly in terms of code size, in particular if the adjustments are explicitly encoded by program routine calls of the type «adjustTrace(N)». In addition, the adjustments would have the adverse effects of making the trace print constant over the entire interval of the code covered by an exception handler. The trace print would then be ineffective in detecting execution disturbances.

One solution to this problem is to force the trace print to a statically known value when execution enters an exception handler. This can be made by the interpreter of the virtual machine when processing exception recovery.

Another possibility is to insert a call to a program routine «setTrace(T)» at the start of each exception handler in which «T» is an arbitrarily chosen value; this program routine positions the «trace» variable at its argument value.

With this solution, the property of execution integrity controlling is locally lost between the execution fragment which precedes the branch and the one which follows it. But it remains globally preserved over the whole program execution.

This method may be more generally applied to all points of strong convergence of the program routine check flow.

Subroutines, in languages such as those of the «Java» virtual machine (JVM) or «Java Card» (JCVM) (trademarks registered by Sun Mycrosystems) raise a similar problem for example. They can be called from several points of the code with different values for the trace print. They can be treated in the same manner as the exception handlers, by forcing the trace print value when entering a subroutine. Since subroutine call points are well delimited (e.g. «jsr» instructions of JVM and JCVM) and generally few in number, they can be treated as normal branches with the insertion of calls to «adjust Trace» before the subroutine calls to guarantee one same trace print value at all call points of one same subroutine.

Also the trace print calculation and its controlling can always be limited to critical code fragments of the program. This makes it possible to reduce the size increase of the code when introducing redundancy as represented by operations on trace prints. This also reduces slowdown due to additional calculations of the program.

Operations on trace prints do not modify program behaviour (if there is no disturbance). Trace print updating operations (of the type «addTrace») and trace print adjustment operations (of «adjustTrace» type) are conceptually positioned on the arcs of the check flow graph which links together the program execution points. In this way, trace print updating and adjustment may depend not only on the program points covered during execution but also on the specific branches followed including the case when several branches link two same points. In practice, when trace print updating and adjustment operations are effectively inserted in the executable program code, they are arranged so as to be executed in sequence between the two program points of the arc on which they are positioned. This insertion may require minor local modifications of the program such as the addition of additional branches.

On the other hand, assignment operations (of «setTrace» type) and trace print controlling operations (of «check Trace» type) are conceptually positioned on the program points and not on the arcs between these points. The trace print value is a property of the program points: irrespective of the execution pathways leading to a given program point, the current value of the trace print (calculated dynamically) must be equal to an expected fixed value (known statically); and this expected value may be forced by a trace print assignment operation.

The trace print value at each execution point of a program routine, and the adjustments to be inserted to make the trace print value predictable may be determined automatically by static program analysis which optionally modifies the program code to make the trace prints predictable and for their controlling.

For this purpose, use is made of a program routine and of data on trace print updating (program points and type of execution observations at this program point), data on trace print assignment (program points where the trace print must be forced to certain values) and optionally on trace print controlling (program points where the trace print must be checked).

Information on trace print updating, assignment and controlling can for example be given by explicit insertions of directives (comments, pragmas, effectively executed code, etc) in the program code. Said directives are given neutral consideration with respect to program check flow: trace print updating directives of «addTrace» type are positioned between two effective execution points (excluding directives) of the program, and therefore on the arcs which conceptually link together the program execution points; the trace print assignment directives («setTrace») and trace print check directives («checkTrace») relate to the execution point following after. The same applies to directives optionally inserted by program transformation: adjustment directives of the type «adjustTrace» are also neutral and are positioned on the arcs (to correct a trace print value before reaching a program point) i.e. between two execution points.

Trace print assignment directives may have been put in place by a prior program transformation. This transformation may for example systematically position a directive of «setTrace» type at every program point where a number of execution branches converge whose number is higher than a given threshold. Said directives may also be positioned systematically at every entry point of the subroutines and/or exception handlers.

Similarly, the values handled by the trace print update directives may also have been previously determined by a prior program transformation. The values used for this updating («addTrace» argument) are generally arbitrary constants. Any value (e.g. random value) can therefore be automatically allocated on each occurrence of a said directive. In some cases it may also be wished to use the invariants of the program. In this case a static analysis of the program is performed to determine invariants at certain program points, e.g. the fact that the sum of two variables is constant, the fact that a variable is lower than a certain threshold, the fact that the number of loop iterations is known, etc. Subsequently, instead of updating the trace print in relation to constants, expressions are used which even though they relate to dynamic program data must have a constant value.

The method of automatically determining expected trace print values is then defined by the following operating sequence:

Initialising all the program points to be explored with the singleton formed of the first program routine instruction.
Memorizing, at the program routine entry point, a trace print value equal to the initial trace print value given.

For as long as said set of program points to be explored is not void:
Extracting a program point (point of origin) from said set of program points to be explored,
For each of the resulting possible program points after execution of the instruction (target points):
If the target point contains a trace print assignment and if this target point has not yet been explored, memorizing at the target point the trace print value defined by the assignment.
If the target point does not contain a trace print assignment and if this target point has already been explored, inserting between the instruction at the point of origin and the instruction at the target point a trace print adjustment which sends the trace print value at the point of origin onto the trace print value memorized at the target point.
If the target point does not contain a trace print assignment and if this target point has not yet been explored, memorizing at the target point the trace print value at the point of origin, optionally modified by a trace print update if one exists between the point of origin and the target point.
If the target point has not yet been explored, adding said target point in said set of program points to be explored.

Some languages do not allow easy handling of neutral directives of the type trace print set and trace print check such as described above. In this case a technique can be used which consists of instrumenting the program code with real instructions.

For example, explicit program routine calls can be inserted in the program code, both for trace print updating and assignment and for trace print controlling. For example in «Java» it can be written:

```
{
    ...
    if (cond) {
        a[i+j] = b[i];
        addTrace( );
    }
    checkTrace( );
}
catch(Exception e) {
    setTrace( );
    ...
}
```

This program fragment can be transformed a first time to allocate arbitrary trace print values for the updating and assignment operations:

```
{
    ...
    (if (cond) {
        a[i+j] = b[i];
        addTrace(28935);
    }
    checkTrace( );
}
catch(Exception e) {
    setTrace(9056);
    ...
}
```

Then the program can be transformed a second time using the above-described method to determine the trace print values at the control points and to insert necessary adjustments. The values allocated by this transformation depend upon the tracing print operator used. The program fragment given as an example above could be transformed as follows:

```
{
    ...
    if (cond) {
        a[i+j] = b[i];
        addTrace(28935);
        adjustTrace(16220);
    }
    checkTrace(13991);
}
catch (Exception e) {
    setTrace(9056);
    ...
}
```

If it is desired to have the possibility of compiling and executing the programme before the transformations, e.g. for debugging, it may be required to adapt the source program. If the trace print set and check library only contains program routines which use an integer for argument, it is illegal to write «checkTrace( )». In this case, the following convention may be adopted: the value «0»(for example) denotes a value still undetermined. Then «checkTrace( )» is written in the initial source code. After transformation, the program routine call will for example become «checkTrace(13991)».

This technique is compatible with program compiling: the program transformations can be made both on the source code and on the object code. For example, in «JavaCard» it can be written:

checkTrace( );

After compiling and conversion to the execution format of the JCVM an object code is obtained in the form:

```
sconst_0
invokestatic checkTrace
```

The method for automatic determination of expected trace print value on «invokestatic» can be applied to the JCVM object code, producing the following code:

```
sspush 13991
invokestatic checkTrace
```

This method for automatically determining trace print values can be combined with a program analysis which, in some cases, conducts unwinding of program loops and recursions. Automatic calculation is then possible of trace prints relating to program variables, as in the above example in which «trace=h(trace,i)» lies inside the loop of index «i».

The trace print can be calculated as indicated above from given observation points explicitly inserted in the program code. The trace print can also be calculated automatically and implicitly by the interpreter of a virtual machine.

In particular, the trace print can relate to the code of instructions executed by the virtual machine. In this way it can be checked that successive execution of program instructions is not disturbed.

The main loop of the interpreter in a virtual machine generally has the form:

```
while (1) {
    //Reading of instruction code at pc address
    opcode = *pc++;
    switch (opcode) {
        case INSTR:
            // Instruction semantics <<instr>>
        ...
    }
}
```

This code can be instrumented as follows:

```
while (1) {
    opcode = *pc++;
    addTrace(opcode);
    switch(opcode) {
        ...
    }
}
```

For the moment it is supposed that the «trace» variable associated with the operation «addTrace» is, at each program routine call, saved in the activation block of the caller program routine and reinitialized at a known value «$T_0$», and that it is symmetrically restored from the activation block of the caller on each program routine return. Therefore at any point of the program, the value of «trace» is «$T_n$=h( . . . h(h($T_0$, $i_1$), $i_2$), . . . , $i_n$)» which is the trace print of the operating codes «$i_1$, . . . , $i_2$» of the instructions executed after entry in the current program routine, ignoring the instructions of called methods.

This implicit trace print updating can be taken into account explicitly and automatically by the above-described method for automatic determination of expected trace print values. Invariants of the program, visible at the virtual machine, may also be used for trace print updating; height of operand stack, presence of certain types of values in the operand stack (if the stack is typed or if data enables identification of their type).

The model for implicit trace print calculation by a virtual machine can be directly transposed to the case of a microprocessor executing native code. To do so the microprocessor must be designed to keep the trace print updated for each executed instruction. With this approach the «trace» variable becomes a special register of the processor, accessed via instructions of «load» and «store» type (to save and restore trace value on entering and leaving procedures), «addi» and «movi» (to correct and initialize the trace value).

From a practical viewpoint, trace print setting must be made so that the processor's critical pathway is slowed down as little as possible. It may also be a releasable functioning mode of the processor, making it possible only to perform trace print calculations in critical code sections. Dynamic releasing of this type may also be used for implicit trace print calculation by a virtual machine.

Another possibility for accelerating trace print calculation is for the processor to have an instruction which performs the update operation «trace=h(trace, x);» in the hardware. This machine instruction can be used both in the interpretation loop of a virtual machine and in native code, where it can be inserted automatically by transformation of the machine code. The processor may also contain dedicated instructions to perform trace print adjustment, assignment and controlling operations.

Said specialized instructions may also be included explicitly in the set of instructions of a virtual machine: instead of operating explicitly on a «trace» variable or making program routine calls of the type: «addTrace(N)», «setTrace(T)», «adjustTrace(N)» and «checkTrace(T)», these operations can be performed by dedicated instructions of the virtual machine. In this case trace print calculation is not implicit: it is explicit and requires a program instrumentation (optionally automatic).

The advantage of this approach is not only a gain in speed but also in memory size. For example, instead of the six octets required by the call «checkTrace(42)» in JCVM object code, only three octets (one for the instruction and two for the short integer argument) would be necessary. If the trace print is updated automatically and implicitly by the execution machine (virtual machine or processor) several improvements could be contemplated.

Firstly to reduce extra cost in terms of execution time due to trace print setting, it can be considered not to modify the trace print for some classes of instructions. This can be made using a table which associates a Boolean with every instruction code, which indicates whether the instruction is to be traced. The main loop of the interpreter is then written as follows:

```
while (1) {
    opcode = *pc++;
    if (update_trace[opcode]
        trace = h(trace, opcode);
    switch (opcode) {
    ...
    }
}
```

The information on the instructions to be effectively traced (here the table «update_trace») can accompany the program while it is being loaded and executed on the execution platform. This information can also vary according to program and even according to the different program routines of the different programs.

It is also possible to «hard» encode this information in the interpreter in cases corresponding to the different instruction codes. For example, this gives:

```
while(1) {
    opcode = *pc++;
    switch (opcode) {
    case INSTR1:// trace
        trace = h(trace, opcode);
        ...
    case INSTR2: // no trace
        ...
    }
}
```

To detect any disturbances on the value of immediate arguments of instructions, it is also possible to integrate them in the trace print calculation. For example, in JCVM, for the instruction «bspush n» (which pushes the integer constant «n» onto to the operand stack), the interpreter can perform «trace=h(h(trace, BSPUSH,n)» instead of simply «trace=h (trace, BSPUSH)».

To maintain the possibility of static calculation of trace print values, this schematic can only be applied to instructions whose immediate arguments are not modified at the time of loading, at the time of link editing. If this is not the case, it must be possible to be able to operate on the program after link editing. This is possible for example when the program is included in the read-only memory (ROM) in a mask of a smart card.

To make the trace print value even more sensitive to the check flow effectively followed within the code of a program routine, the conditional branch instructions (e.g. «ifzero» in JCVM) and multiple branch instructions (e.g. «stableswitch» in JCVM) can update the trace differently depending upon whether or not the conditional branch is taken, or depending upon the entry of the selected jump table. For example:

```
switch (opcode) {
case IFZERO:
    if(top_of_stack == 0) {
        trace = h(trace, BRANCH_TAKEN);
        pc+=pc[0];
    } else {
        trace = h(trace, BRANCH_NOT_TAKEN);
        pc+=1;
    }
...
```

This improvement can also be seen as taking into account the known value of the expression «top_of_stack==0» in each of the branches of the instruction «ifzero», i.e. «true» and «false» respectively.

In all the above description the trace print is calculated program routine by program routine. There is no purpose, and it is potentially costly in terms of execution time, in updating the variable «trace» when interpreting program routines which will never consult the value of this variable, i.e. which do not contain operations of the type «checkTrace». The information indicating whether a program routine contains a «checkTrace» operation can easily be determined by simple examination of the program routine code.

The interpreter of the virtual machine can then be modified as follows:

```
while (1) {
    opcode = *pc++;
    if(method_flags & NEEDS_TRACE)
        trace = h(trace, opcode)
    switch (opcode) {
    ...
    }
}
```

In the particular case of JCVM, this information can for example be calculated once and for all (e.g. on program loading) and saved in bit form in the «flags» field of the structure «method_info».

Up until now, the execution trace print has been considered local to each method: the «trace» variable is preserved on program routine call, and its value represents a trace print of the execution observation points within the current program routine, excluding called program routines. The variable «trace» can also be made global, and hence contain a trace print of all executed instructions, including via program routine calls, from known entry points (e.g. the «process» and «install» methods of a «Java card» applet) in which «trace» has been initialized at known values.

The reasons are twofold: firstly the possibility of controlling, in a single «checkTrace» operation, the absence of disturbances in the complete execution of the program, and not just in execution of the program routine in which «checkTrace» lies; and secondly, for cases when the trace print is implicitly set by the execution machine, the simplification of this machine (no longer any need to save and restore «trace» on each call).

The main difficulty with this approach is the static calculation of trace print values at every program point. This calculation remains possible, but requires either analysis of the complete program (interprocedural) or the establishing of invariants on trace print values at the start and end of each program routine.

In the global analysis approach it is assumed that, at the time of static analysis, the code is known of all the program routines which may be called directly or indirectly from program entry points, including program routines belonging to other programs in particular those of libraries.

Under this assumption, the above-described method for static determination of the trace print proceeds as follows: instead of analysing and transforming each program routine individually, they are all transformed at the same time by treating program routine call instructions («invoke», «call», etc) as unconditional branches on the first instruction of the called program routine, and the return call instructions («return», etc) as branches towards instructions following immediately after the corresponding call.

In other words, procedure is no longer on the check flow graph of the program routine but on the interprocedural check flow graph containing additional arcs corresponding to program routine call and return instructions. It will be noted that for the instructions which dynamically determine the program routine to be effectively called (such as calls to virtual method or interface method) arcs are added from and to all the program routines in which the call can be solved dynamically. For example, in JVM, a simple approximation of all the target methods of «invokevirtual C.m» is the group of methods «m» defined in class «C» or one of its sub-classes. (Better approximations of this group can be obtained using static check flow analyses).

The method described above for a program routine, applied to this interprocedural graph, will insert the necessary trace print adjustments so that the trace print value is the same at all call sites of one same program routine, and at the end of all the program routines likely to be called from the same call site.

The problem with the above global approach is that the assumption that the code of all the program routines is known, is sometimes to strong: the code is known of the package methods during transformation, but not necessarily the code of the library program routines or the code shared with other programs.

One first solution is to preserve the trace print value through calls to program routines which are not part of the program, e.g. by saving and restoring the «trace» variable around these calls.

Another solution, which also saves on interprocedural check analysis, consists of establishing the following «contract» between all program routines: for each program routine of name «r» if the trace print value is «E(r)» on entry into the program routine, then the trace print value is «S(r)» on leaving the program routine. Here «E» and «S» are functions associating arbitrary trace print values with program routine names, e.g. calculated by cryptographic tracing print. The program routine signature (type of its arguments and return value) may also be associated with the name, in particular if it enables the distinguishing between program routines unrelated to one another.

The above «contract» is easy to ensure: before each instruction for call to a program routine «r», a trace print adjustment is inserted to bring it to value «E(r)»; and for each return call instruction, a trace print adjustment is similarly inserted to bring its value to «S(r)».

This principle extends to methods that are determined dynamically at the time of the call. For example in «Java» or «JavaCard», pairs can be used «(m, s)» in which «m» is a method name and «s» a method signature. Trace prints of this pair enable the defining of «E(m, s)» and «S(m, s)». It can be noted that if a virtual method redefines another method, these two methods have the same name and same signature, hence the same values «E» and «S». The «contract» on the trace prints for method call and return is therefore applied in similar manner.

Insofar as only the names of program routines are taken into account (and optionally their signatures) the determination of trace print values can be made program routine by program routine, without knowing the entirety of the program. Early exit from a program routine via a non-recovered exception does not raise any additional problem on the assumption that the virtual machine (implicitly) or the exception handler (explicitly) always reinitializes the trace print to a known constant value when an exception is triggered.

Instead of requesting the programmer to explicitly indicate in the source at which places a trace print verification must be made (e.g. with explicit calls to «checkTrace( )») these checks can also be inserted automatically using a code transformation tool.

For example, in JCVM, a check can be performed:
before each instruction which writes in non-volatile memory (EEPROM): writing in a class field («putstatic») or instance field («putfield»), writing in a table («x-astore»),
at the start and end of each transaction,
before the call to certain library methods, etc.

This makes it possible in particular to set up a policy of execution integrity controlling which considers that the program can execute any operations, possibly disturbed, for as long as it does not seek to modify the value of non-volatile data and to perform entries-exits.

The strategy of automatic insertion of trace print verifications is easy to change, since it solely affects the transformation phase of the code. In practice it arises from a compromise to be found between the frequency of verifications, the increase in code size and execution time due to «check Trace» operations.

Rather than modifying the program explicitly by inserting instructions in the code (e.g. to calls to program routines of the type «addTrace», «checkTrace», «adjustTrace» and «setTrace»), the trace print set and check data can be stored in tables independent of the executable code of the program. These data items may contain the program points where a trace print operation is performed and associated values (the arguments of these operations). It is then the execution machine (e.g. a virtual machine) which takes in charge the performing of these operations when the current program point passes through program points memorized in the tables.

Rather than the effective argument of a trace print operation, the tables can also store values which indicate which dynamic data are to be taken into account in the operation. For example a complex entry corresponding to «addTrace» may indicate that the trace print is to be updated using the current value of a variable or register of the machine (because its value is known statically).

One advantage of this approach is to use up less memory space with trace print calculation and check data. On the other hand, it may be costly in terms of execution time on account of table searches. If there is a performance problem, a mixed approach could be used: some operations are calculated automatically by the execution machine; other operations are explicitly inserted in the program code; and other operations are stored in tables. For example, the operation «addTrace» can be calculated by a virtual machine; the «checkTrace»and «setTrace»operations can be expressed by explicit program routine calls; and «addTrace»can be implemented by a table search. In addition, for reasons of efficacy, a table search for «adjustTrace» could only be performed in the case when a branch is taken (assuming that effective adjustments are performed solely in such cases).

Insofar as the trace print calculation and check operations are not standardized, an instrumented program such as described above for controlling execution integrity may possibly not function on execution platforms which are not adapted.

If the code explicitly shows program routine calls on the trace prints (of the type «addTrace», «checkTrace», «adjustTrace»and «setTrace»), the program may be accompanied by a library which implements these program routines. It will then be portable on all execution platforms. However if the platform has more efficient implementation, it may substitute the latter in the place of the one supplied with the program.

When trace print setting and controlling operations are encoded in tables, the program is even further portable. For example, for JCVM, the tables can be provided in the form of additional personalized components: either the machine recognizes and uses these tables; or it does not recognize them and ignores them (and in this case does not perform controlling of execution integrity).

The invention claimed is:

1. Method for controlling program execution integrity by verifying execution traces, comprising:
   updating a trace print representing an execution pathway and/or handled data on program execution,
   adjusting the trace point along the execution pathways before reaching certain points of convergence of a check flow so that trace prints of converging pathways are made equal,
   comparing said trace print calculated dynamically with an expected value fixed statically, equal to a value the trace print should have if program execution is not disturbed at determined points of the program, and
   performing special treatment if the current trace print differs from the expected value.

2. Method as in claim 1, wherein the special treatment of the program if the current trace print differs from the expected value, consists of securitizing certain data and/or alerting a user of the ill-functioning by a sound or visual signal and/or interrupting the execution of said program whether definitively or not.

3. Method as in claim 1, wherein said trace print only concerns critical code fragments of the program and/or program status which is considered critical.

4. Method as in claim 1, wherein said trace print is calculated incrementally along the execution pathway of the program by successive composition of a function of which one argument is the current trace print value and of which another argument is representative of local execution of the program or an expression that relates to dynamic program data.

5. Method as in claim 4, wherein said function consists of one of the following functions: «checksum», linear congruency, cyclic redundancy check (CRC), cryptographic tracing print, or combination of the following operations: addition, subtraction, «or»exclusive logic with a constant or with said observation data item; rotation of a constant number of bits; multiplication by an uneven constant.

6. Method as in claim 1, wherein the adjustment operation consists of a combination of the following functions: assignment to a constant value, addition with a constant, «or» exclusive logic «xor»with a constant value.

7. Method as in claim 1, wherein, at certain points of the program, the trace print is assigned to a certain value rather than deducted from a preceding trace print value.

8. Method as in claim 7, wherein said program points are those where execution branches converge whose number is greater than a certain threshold and/or those which are entry points of subroutines and/or of exception handlers, and in that said assigned value is a given value and/or any value determined by random drawing and/or a program expression determined by previous analysis as an invariant at the program point under consideration.

9. Method as in claim 1, wherein the trace print value is compared with the expected value at program points determined by their particular characteristic in a check flow graph of said program and/or by the type of operations performed at said program points.

10. Method as in claim 9, wherein said program points are located after each branch and/or before each join of the check flow and/or before each operation which writes in non-volatile memory and/or before certain cryptographic operations and/or before a call to certain library routines and/or after a call to certain library routines.

11. Method as claimed in claim 1, wherein trace print setting and/or trace print controlling are made:
   explicitly by an instrumentation of the program
   explicitly by the execution machine, on the basis of complementary program data which indicate to said execution machine at which program points and/or with which values the trace print setting and/or controlling operations are to be made, said values including values resulting from complex operations, and/or
   implicitly by the execution machine, on the basis of a particular observation of executed instructions.

12. Method as in claim 11, wherein said instrumentation of the program code is based on explicit handling of a variable or a register representing the trace print and/or on the call to specialized routines and/or on the use of specialized instructions of the execution machine.

13. Method as in claim 11, wherein said complementary program data is coded in tables which associate program points with a code defining an operation to be performed, and which are only consulted by the execution machine when executing particular instructions.

14. Method as in claim 13, wherein said particular instructions are branches and/or writing in non-volatile memory and/or calls to certain program routines and/or certain cryptographic operations.

15. Method as in claim 1, wherein the expected trace print values and trace print adjustment values at given program points are determined by static analysis of the program which can simulate an unwinding of some loops and recursions and which can modify the program to make the trace print values predictable and/or to check these values.

16. Method as in claim 8 wherein for the purpose of said analysis, information is provided concerning trace print updating corresponding to program points and type of execution observations at this program point, and/or trace print adjustment corresponding to program points where the trace print must be adjusted to a certain value, and/or trace print assignment corresponding to program points where the trace print must be forced to a value, and/or trace print controlling corresponding to program points where the trace print must be checked, this information:
- being determined automatically,
- being given in the form of directives consisting of instructions placed in the program code and operating on the trace print, such as program routine calls, whether or not taking any integer as argument, and/or being given in the form of tables complementary to the program,
- and able to be completed and/or modified in accordance with the values calculated by said analysis.

17. Method as in claim 16, wherein for each program routine, the expected trace print values are determined by the following operating sequence:
- initialising all the program points to be explored with the singleton formed of the first program routine instruction,
- memorizing, at the program routine entry point, a trace print value equal to the initial trace print value given,
- for as long as said set of program points to be explored is not void:
  - extracting a program point from said set of program points to be explored, said program point being a point of origin,
  - for each of the resulting possible program points after execution of the instruction, said resulting possible program point being target points:
    - if the target point contains a trace print assignment and if this target point has not yet been explored, memorizing at the target point the trace print value defined by the assignment,
    - if the target point does not contain a trace print assignment and if this target point has already been explored, inserting between the instruction at the point of origin and the instruction at the target point a trace print adjustment which sends the trace print value at the point of origin onto the trace print value memorized at the target point,
    - if the target point does not contain a trace print assignment and if this target point has not yet been explored, memorizing at the target point the trace print value at the point of origin, optionally modified by a trace print update if one exists between the point of origin and the target point,
    - if the target point has not yet been explored, adding said target point in said set of program points to be explored.

18. Method as claimed in claim 16, wherein the trace print concerns complete execution of the program (including with program routine calls) from its entry points, said method being applied to a set of routines by treating the instructions of static program routine call as unconditional branches on the first instruction of the called program routine, the instructions of dynamic program routine call as conditional branches on the first instruction of the corresponding called program routine, and the instructions of return call as branches towards the instructions following immediately after the corresponding call.

19. Method as claimed in claim 11, wherein the program and/or the execution machine are instrumented so that the trace print is saved on certain calls to routines, such as those which are not part of the program or cannot be analysed, and is restored on return call.

20. Method as claimed in claim 11, wherein the program and/or the execution machine are instrumented so that the trace print is adjusted on call and return from certain routines, including routines determined dynamically at the time of call so that it is equal to:
- on entry of the called program routine: a value which depends on the name and/or signature of the called program routine, such as a value obtained by cryptographic tracing print of the name and/or signature;
- after return in the calling program routine: a value which similarly depends on the name and/or signature of the called program routine, each exception handler concerned by the program routine call having to assign the trace print to a determined value, said exception handler being able to be affected when an exception is lifted in the called program routine.

21. Method as claimed in claim 3, wherein if the trace print is updated implicitly by an execution machine:
- trace print setting may be temporarily suspended to avoid unnecessary calculations when executing non-critical code fragments of the program and/or when program status is not considered critical and/or during the execution of certain routines not performing a trace print check;
- trace print setting, if it is not suspended, relates to each executed instruction,
  - including some of its immediate arguments and/or some of program invariants for this instruction, such as the height of the operand stack or the presence of certain types of values in the operand stack, and/or choices of branch made if the instruction is a branch,
  - but provided that the executed instruction belongs to a given class of instructions to be observed, said class being fixed for the execution machine or else given by a table associating a Boolean with every instruction code indicating whether the instruction is to be observed, and said table being specific to different routines and/or different programs.

22. Method as in claim 11, wherein:
- some operations on the trace print, such as trace print assignment and controlling, are inserted explicitly in the program code;
- some operations on the trace print, such as trace print adjustment, are performed explicitly by the execution machine in relation to complementary program information,
- some operations on the trace print, such as trace print updating, are performed implicitly by the execution machine.

23. Method as in claim 11, wherein:
- if trace print set and/or check operations are made by program routine calls, the program is accompanied by a library which implements these routines, said library possibly being substituted by a special implementation when loading on an execution platform;
- if the trace print set and check operations are expressed by complementary program information and if the execution platform does not know and/or cannot and/or does not want to use this information, said information is ignored to enable execution without integrity controlling.

24. Method as claim 19, wherein the execution machine of the program has specialized instructions for trace print calculation and/or trace print update and/or trace print adjustment and/or trace print assignment and/or trace print controlling and/or trace print saving on calls to routines and trace print restoration on return from a program routine, these instructions appearing explicitly in the program code and/or being used to implement the execution machine.

25. Execution system enabling controlling of execution integrity wherein said system includes a microprocessor which has specialized instructions for trace print calculation and/or trace print update and/or trace print adjustment and/or trace print assignment and/or trace print controlling and/or trace print saving on calls to routines and trace print restoration on return from a program routine, wherein said controlling comprises the following steps:

updating a trace print representing an execution pathway and/or handled data on program execution, comparing said trace print with an expected value at determined points of the program, wherein said trace point is a current value, calculated dynamically, and the expected value is fixed statically, equal to a value the trace print should have if program execution is not disturbed, performing special treatment if the current trace print differs from the expected value.

* * * * *